(12) United States Patent
Myers

(10) Patent No.: US 6,256,900 B1
(45) Date of Patent: Jul. 10, 2001

(54) SINE SET MITER GAUGE AND METHOD

(76) Inventor: Charles L. Myers, 989 Blockhouse Valley Rd., Clinton, TN (US) 37716

( * ) Notice: Subject to any disclaimer, the term of this patent is extended or adjusted under 35 U.S.C. 154(b) by 0 days.

(21) Appl. No.: 09/444,191

(22) Filed: Nov. 19, 1999

(51) Int. Cl.$^7$ ............................ B27G 23/00; B23D 33/02; B23D 33/12
(52) U.S. Cl. ............................ 33/640; 33/471; 83/435.12; 83/435.13; 83/435.14; 83/581; 83/468.3
(58) Field of Search ................ 33/640, 471; 83/435.12, 83/435.13, 435.14, 581, 468.3, 435.1, 425, 437

(56) References Cited

U.S. PATENT DOCUMENTS

| | | | |
|---|---|---|---|
| 2,884,965 | * 5/1959 | Stahl | 33/640 |
| 3,083,744 | * 4/1963 | Vold | 33/640 |
| 4,454,793 | 6/1984 | Strong | 83/421 |
| 4,514,909 | 5/1985 | Gilbert | 33/471 |
| 4,741,387 | 5/1988 | Strong | 83/421 |
| 4,779,354 | * 10/1988 | Hill | 33/640 |
| 5,121,553 | * 6/1992 | Boerder | 33/640 |
| 5,121,554 | * 6/1992 | Havins | 33/640 |
| 5,402,581 | * 4/1995 | Hurd et al. | 33/471 |
| 5,473,821 | * 12/1995 | DiMarco | 33/456 |
| 5,491,906 | * 2/1996 | Reilly | 33/640 |
| 5,632,096 | * 5/1997 | Horvath | 33/628 |
| 5,735,054 | * 4/1998 | Cole | 33/471 |
| 6,101,733 | * 8/2000 | Horvath | 33/640 |

FOREIGN PATENT DOCUMENTS

| | | | |
|---|---|---|---|
| 646092 | * 8/1962 | (FR) | 33/76 VA |
| 859739 | * 8/1962 | (FR) | 33/76 VA |

* cited by examiner

Primary Examiner—G. Bradley Bennett
Assistant Examiner—Gail Verbitsky
(74) Attorney, Agent, or Firm—Robert M. Poteat, P.C.

(57) ABSTRACT

A miter gauge and method which provides substantially improved resolution in setting the miter angle without adding mechanical complication to the miter gauge mechanism compared to a conventional gauge configuration. The gauge includes a rectangular guide bar which slidably fits within the conventional guide groove of a cutting tool. The guide bar includes an elongated bar and is provided with a first reference pin hole aligned with the center axis of the guide bar for receiving a reference pin (F) held at a known distance of 5 inches from a pivot point on the bar. A slotted semi-circular frame is pivotally mounted to the top surface of the guide bar to pivot about the fixed pivot point on the guide bar. The guide frame includes a planar guide surface or fence against which the workpiece is held as it is moved into the cutting blade of the tool. The slotted semi-circular frame is provided with angular indicia typically between 0° and 60° on each side of the guide frame center line to help set the desired miter angle. A combination handle and screw extends through the slot in the frame and threadably engages the guide bar to clamp the frame at the selected angle with the guide bar. The frame further includes a rearward extending tab which supports a second, or fixed (S), reference pin at the same radial distance of 5 inches from the pivot point of the guide bar as the F pin hole in the guide bar so that the two pins remain on the same radius as the frame is pivoted. The exact miter angle is then set by accurately gauging the distance between the F and S pins in accordance with that determined by the relationship $$FS = 10 \cdot \text{Sine}(\theta/2)$$

where $\theta$ is the desired miter angle.

10 Claims, 3 Drawing Sheets

SINE SET MITER GAUGE AND METHOD

BACKGROUND OF THE INVENTION

This invention relates generally to miter gauge devices for use with cutting tools and the like, and more particularly to an improved miter gauge and method for setting the miter angle with high precision.

Various cutting tools for use with either metal or wood cutting devices such as table saws, jigsaws, band saws and the like, use a miter gauge to establish the miter angle between a workpiece and the cutting blade of the device and guide the workpiece into the cutting blade at the selected miter angle. Typically, these guides consist of an elongated rectangular slide bar which slides in a similar sized groove in a flat surface of the cutting device over which the workpiece slides as it engages the cutting blade. The groove extends parallel to the cutting line of the device such that the guide line of the miter guide is parallel thereto. A slotted semi-circular frame is pivotally mounted on the slide bar and is provided with a protractor type angular indicia typically between 0° and 60° on each side of the guide line to set the desired miter angle. A combination handle and screw extends through a slot in the frame to clamp the frame at the selected angle with the slide bar. The frame includes a planar guide surface or fence which is disposed at right angles to the flat surface of the cutting device against which the workpiece is held as it is moved into the cutting blade.

These typical miter gauges are limited in accuracy due to the introduction of human error in reading the angular indicia, particularly for non standard angles in which the operator must guess the location of fractions of angles between the graduation of the angular indicia on the gauge.

Various means have been proposed in the art to increase the resolution at which the miter angle can be set including enlarging the size of the semicircular frame in order to increase the gauge indicia resolution by increasing the radius of the location of the indicia from the pivot point. Another means is disclosed in U.S. Pat. No. 4,514,909, issued May 7, 1985, for "Miter Gauge," by Curtis R. Gilbert. In this device, the pivotally mounted frame includes a ring gear mounted atop a post at the pivot point which turns with the pivotal frame and engages a pinion gear attached to a rotatably mounted angle index dial mounted on the guide bar. The index dial is graduated to show the miter angle at which the gauge is set. The gears are operative to rotate the angle index dial through a greater angle than the miter angle by a ratio of six-to-one to increase the resolution with which the miter angle is set.

Although the rotatably mounted angle index dial may improve the accuracy in which miter angles may be set and fractions more correctly interpolated over typical gauges, the mechanism adds complication to the miter gauge and makes the gauge hard to handle due to the added gears and large angle index dial necessary to increase accuracy. Thus, it will be seen that there is a need for an improved miter gauge which is simple to operate and does not add increased size and complication to the gauge mechanism.

In view of the above need it is an object of the present invention to provide a miter gauge and method which substantially improves the resolution with which a miter angle may be set on a miter gauge without complicated additional hardware and mechanical parts.

Another object of this invention is to provide a miter gauge and method in which the resolution is increased without increasing the size of the pivotally mounted frame of the gauge on which the angular indicia is provided.

Other objects and many of the attendant advantages of the present invention will become obvious to those skilled in the art from the following detailed description taken in conjunction with the drawings.

SUMMARY OF THE INVENTION

The present invention is a miter gauge and method which provides substantially improved resolution without adding mechanical complication to the miter gauge mechanism compared to a conventional gauge configuration. The gauge includes a rectangular guide bar which slidably fits within the conventional guide groove of a cutting tool which has a flat top surface over which a workpiece slides as it is moved into the cutting blade or the like. The guide bar includes an elongated bar and is provided with an upwardly extending rear-end portion on the top surface having a first reference hole aligned with the center axis of the guide bar for receiving a first reference pin (F) which when placed in the opening in the guide bar is held at a known distance X from a pivot point on the bar. A slotted semi-circular frame is pivotally mounted to the top surface of the guide bar to pivot about the fixed pivot point on the guide bar. The guide frame includes a planar guide surface or fence which is disposed at right angles to the flat surface of the cutting device against which the workpiece is held as it is moved into the cutting blade of the tool. The slotted semi-circular frame is provided with angular indicia typically between 0° and 60° on each side of the guide line to help set the desired miter angle. A combination handle and screw extends through a slot in the frame and threadably engages the guide bar to clamp the frame at the selected angle with the guide bar. The frame further includes a rearward extending tab which supports a second, or satellite, reference pin (S) at the same radial distance X from the pivot point of the guide bar as the F pin opening in the guide bar so that as the frame is pivoted about the pivot point on the guide bar the pins F and S remain on the same radius X from the pivot point on the guide bar. The exact miter angle is then set by accurately setting the distance between the F and S pins according to the that determined for the desired miter angle.

In accordance with the method of the present invention, the radial distance X of the pins F and S from the pivot point are fixed at a value of 5 inches and the desired miter angle, which is the angle θ between the lines passing from the pivot point to the pins F and S, respectively, is set on the miter gauge by determining the distance FS to be set between reference pins F and S for the desired miter angle in accordance with the relationship $FS = 10 \cdot Sine(\theta/2)$ and setting the reference pins at this distance FS by rotating the semicircular frame about the pivot point on the guide bar while using a precision linear distance gauging device to set the desired distance between the pins FS.

It has been found that by fixing the distance X at 5 inches, the distance FS is easily determined by dividing the desired angle (θ) by two (θ/2), determining the sine value (y') for the new angle (θ/2) in accordance with the formula y'=Sine(θ/2), moving the decimal point of the determined sine value y' one decimal place to the right to obtain the value FS in accordance with the formula FS=y'×10, giving the above relationship:

$FS = 10 \cdot Sine(\theta/2)$

The proof for this relationship will be shown hereinbelow.

DETAILED DESCRIPTION

Figure 1:
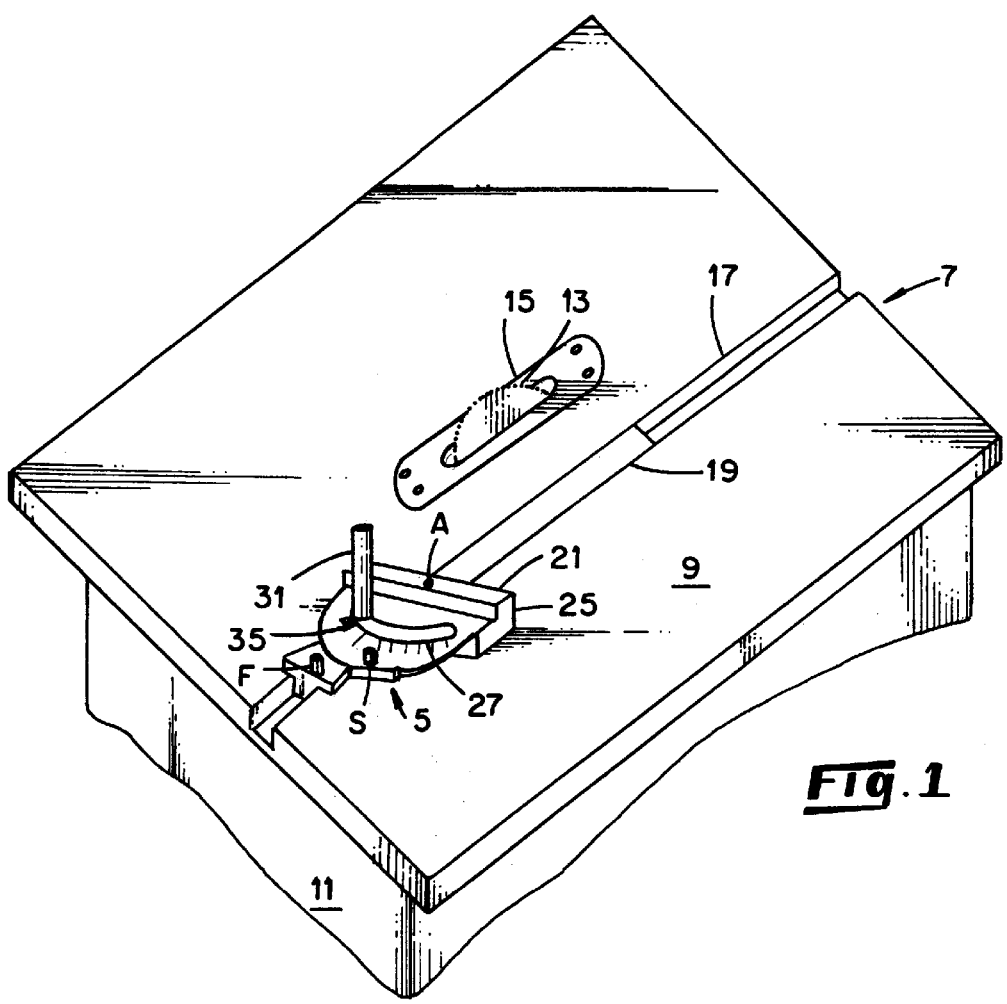
FIG. 1 is a perspective view illustrating the miter gauge according to the present invention for supporting a wooden workpiece on the flat surface of a table saw.

Referring now to the drawings, wherein like reference numerals refer to identical parts throughout the Figures, and particularly to FIG. 1, a miter gauge 5 made in accordance with the present invention is shown for use on a table saw generally indicated at 7. Although the invention will be illustrated by means of its application to a table saw, it will be understood that the miter gauge may be embodied for use with various other cutting tools as indicated above. As shown in FIG. 1, the typical table saw includes a flat upper surface 9 supported by a base member 11 and has a rotating cutting blade 13 which extends upward through a slotted plate 15 disposed flush with the upper surface 9. The table is provided with a rectangular cross-section guide groove 17 parallel to the blade into which the guide bar 19 of the miter gauge is slidably disposed to move a workpiece not shown into the blade 13 at the desired miter angle. A semicircular frame 21 is pivotally mounted on the guide bar 19 at location A by means of a screw 23, see FIG. 3, which extend through the guide bar 19 and the head is countersunk in the bottom surface of the bar so that it does not interfere with the sliding motion of the bar in the groove 17.

Figure 3:
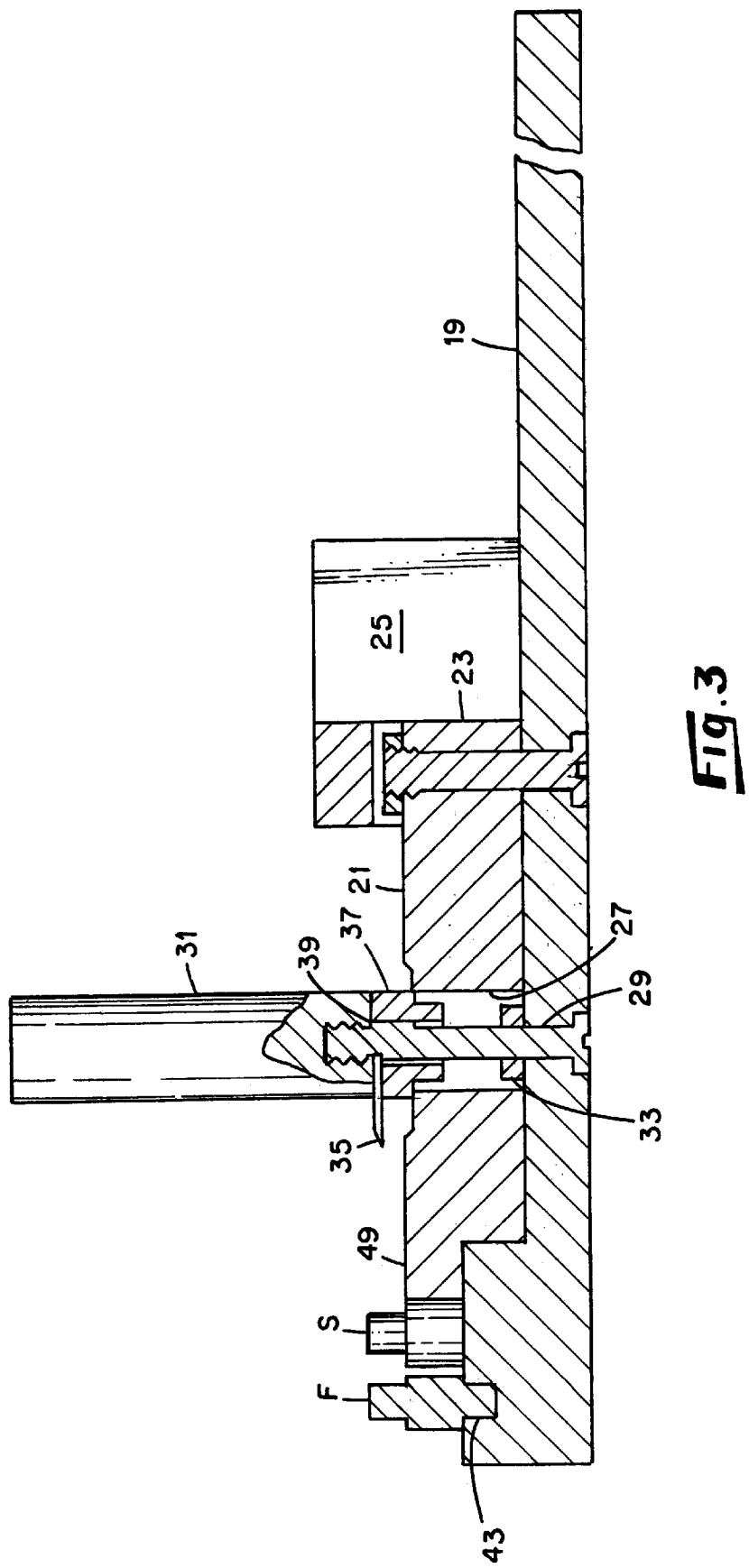
FIG. 3 is a cross sectional view of the miter gauge shown in FIG. 2, taken along lines 3—3.

The frame 21 includes a front, smooth-face portion 25 which is disposed at a right angle to the table surface 9 against which a workpiece is held as it is moved over the table surface. A semicircular slot 27 is provided in the back portion of the frame through which a bolt 29 extends from the guide bar and threadably engages a handle 31 which extends upward from the back portion of the frame 21. The bolt 29 has a head which is countersunk in the bottom surface of the guide bar and is secured to the guide bar 19 by means of a nut 33 (FIG. 3). The handle 31 acts as a clamp by tightening the handle on the screw 29 to clamp the frame to the guide bar at the selected miter angle which is generally indicated by the angular indicia on the frame 21 about the rear edge of the slot 27 and a pointer 35 fixed in the bolt 29 at the base of the handle 31. As shown in FIG. 3, a spacer ring 37 is provided between the bottom end of the handle 31 and the upper surface of the frame 21 which contacts the frame at the edges of the slot 27 as the handle 31 is tightened onto screw 31 to clamp the frame. The spacer ring 37 is machined to fit over a guide 39 formed on the surface of bolt 29 which allows the spacer to move up and down as the handle is loosened or tightened while preventing rotation of the spacer against the pointer 35. In this manner, the frame is rotated to the desired miter angle and the handle is screwed down to clamp the frame at the desired angle, which is generally indicated on the frame angle indicia.

Figure 2:
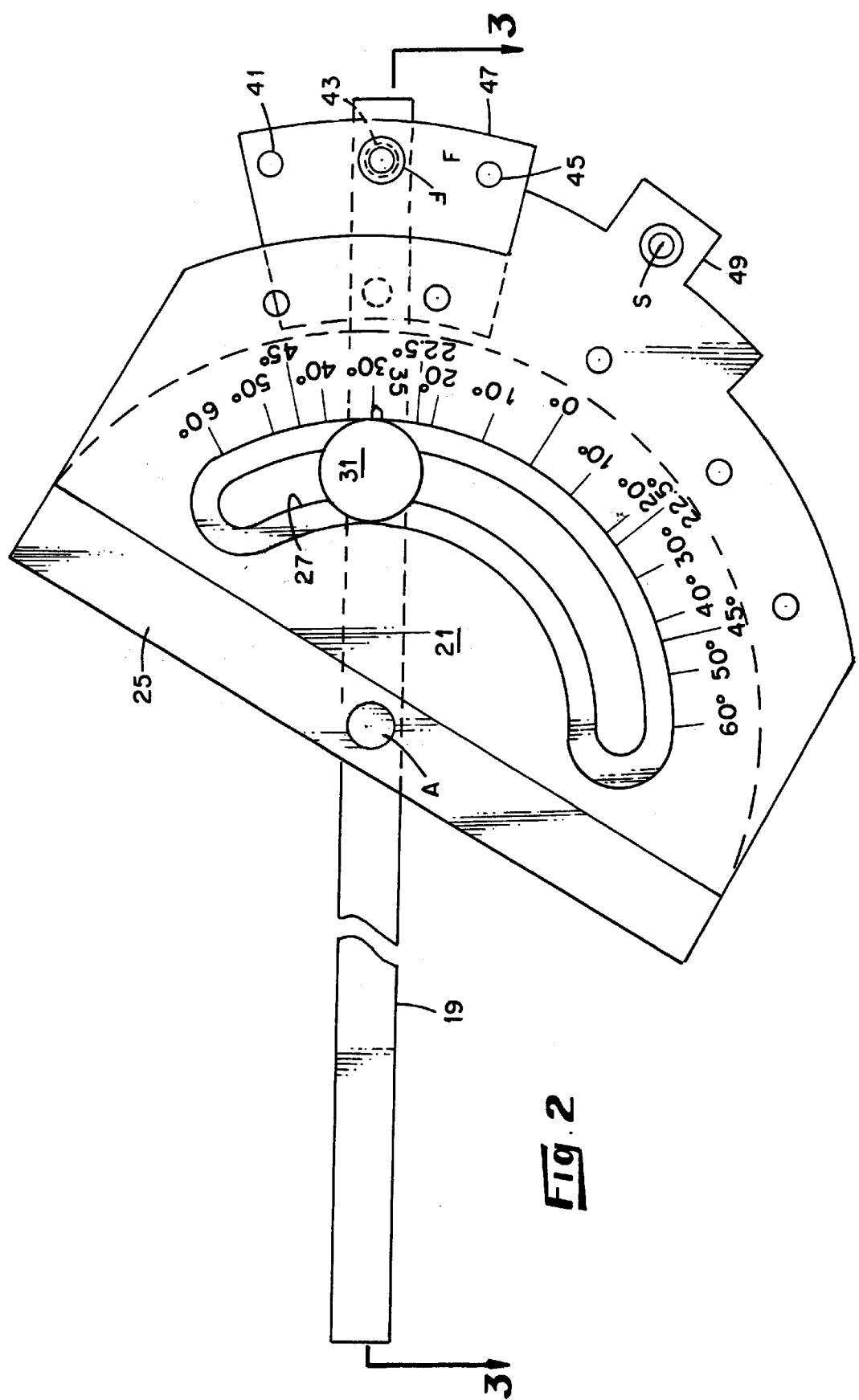
FIG. 2 is a plan view of the miter gauge shown in FIG. 1.

As shown in FIGS. 2 and 3, a pair of reference pins F and S are provided on the back ends of the guide bar 19 and the frame 21, respectively. Pin F is removably positioned in one of a plurality of holes 41–45 in a rear, upward extending platform 47 of the guide bar 19. Only the central opening 43 is shown in FIG. 3. Pin S in fixedly mounted in a rearwardly extending tab portion 49 of frame 21 so that the top portions of pins F and S are at the same level, as shown is FIG. 3. The center line of the holes 41–45 and the S pin on the frame 21 are all located on a common radius X from the frame pivot point A, see FIG. 2. The top surface of the rearward extending platform 47 of the guide bar 19 is formed to fit beneath the tab 49 of the frame 21 so that, when the frame is pivoted through the 0° location, the tab 49 passes over the platform 47, assuming that the pin F is removed.

As pointed out above each of the holes in the platform 47 and the pin S are located on a common radius with respect to the pivot point of the frame 21. Further, this radial distance is fixed at 5 inches for the reason as will be explained hereinbelow. The additional holes 41 and 45 in the platform 47 are used to set angles less than about 10° on either side of the 0° location in which the pin S sits directly over hole 43 in platform 47 of the guide bar 19. By fixing the radius of the pin locations at 5 inches it has been discovered that the exact desired miter angle may be set by rotating the frame 21 until the distance between pins F and S is equal to that determined in accordance with the following relationship $$FS = 10 \cdot \text{Sine}(\theta/2)$$

where $\theta$ is the desired miter angle to be set. The distance between pins may then be set with an accurate gauging device, such as a digital caliper or electronic micrometer as will be explained hereinbelow.

Figure 4:
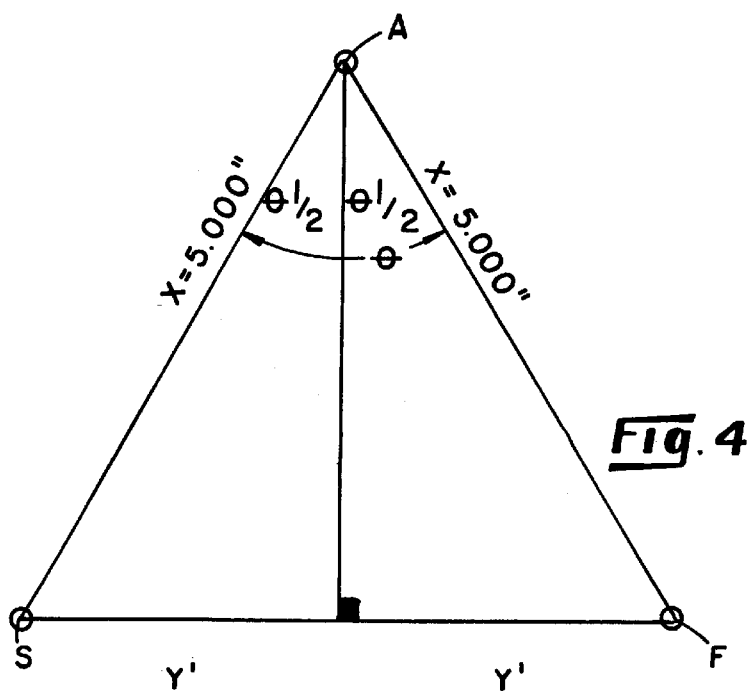
FIG. 4 is a graphic illustration of the method of precisely determining and setting the distance between reference pins F and S on the miter gauge in FIGS. 1–3 for the desired miter angle.

Referring now to FIG. 4, the method of operation of the miter gauge of the present invention will be explained. To illustrate the method, assume that the desired miter angle $\theta$ to be accurately set is 30°, as shown in FIG. 2. From the stored position at 0°, where the S pin in tab 49 of the frame 21 is directly over the hole 43 in the platform 47 of the guide bar 19, the handle 31 is unlocked and the frame 21 is rotated to the general vicinity of 30 degrees, as indicated on the angular graduations of the protractor type gauge on the frame, so that the pointer 35 is pointing at the 30 degree graduation on appropriate side of 0° for the angle to be cut on a workpiece. The pin F is inserted in hole 43. Since the centers of pins F and S are always at a fixed distance of 5 inches from the pivot point A of the frame 21, as illustrated in FIG. 4., connecting points F and S forms an isosceles triangle (a triangle having two equal sides). A line drawn perpendicular to the base line (FS) and passing through the pivot point A bisects the angle $\theta$ into two equal angles $\theta/2$ and thus divides the isosceles triangle into to equal right triangles. Thus, the base y' of each triangle is equal such that FS=2y'. Further, since y'=AF·Sine($\theta/2$), then FS=2(AF·Sine($\theta/2$)). Therefore, for the desired miter angle of $\theta$=30° and AF=X =5.000 inches, it will be seen that FS=2(5.000"·Sine(15°)). Since, the value of the Sine 15° from the trig tables is 0.25882, solving for FS=2(5.000"·0.25882)=2.5882".

From the above solution, it will be seen that since the sides (hypotenuses of the right triangles formed) are equal no trig calculations are necessary. For all miter angles to be set, one simply divides the miter angle $\theta$ in half, and looks up the sine of $\theta/2$ in the trig tables and then move the decimal point one place to the right, i.e. multiply by 10, and you have the distance FS. For example, in the case above where $\theta$=30°, $\theta/2$=15°; and, since the sine of 15° is 0.25882, moving the decimal point one place to the right gives the value of FS=2.5882", as calculated above. Therefore, it will be seen that for the configuration here, FS can be determined from the following relationship.

$$FS = 10 \cdot \text{Sine}(\theta/2)$$

This simple formula works for any angle setting in the present device. Setting of degrees, minutes, and seconds is possible through interpolation. Accuracy to degrees and minutes are given in the sine tables.

This sine set method requires an outside diameter measurement between the pins F and S. The preferred measuring device is a pair of 6 inch electronic digital calipers which displays measurements directly on an LCD screen built into the calipers. To use the calipers close the jaws of the calipers to zero distance and clear the screen so that the readout shows zeros. Measure the pin diameter of one of the pins F or S and again clear the readout to zero. Assuming both pins have a diameter of 0.25 inch, then the calipers should read 0.250 when the pin diameter is measured. Once the calipers are cleared at this setting, the center line distance between the pins, distance FS, can be set by continuing to open the jaws of the calipers from the pin diameter zeroed position to the distance at which the pins are to be set for the desired miter angle. The calipers are then locked in this position and the frame 21 of the miter gauge is pivoted until the distance between the outer sides of the pins FS snugly fits within the jaws of the calipers. Once the distance between the pins is set, the handle 31 is locked into position and the miter gauge is ready to be used to cut the selected miter angle.

To set miter angles less than about 10°, the holes 41 and 45 in the platform 47 on either side of the center hole 43 are used to gauge the angle to be set. As pointed above, these holes are on the same 5 inch radius form the frame pivot point A as the center hole 43 in which pin F is normally placed to set angles as described above. The holes 41 and 45 are located at a fixed offset angles φ on either side of the center line of hole 43.

To illustrate the operation of the gauge for smaller angles in which the frame 21 does not rotate sufficiently to allow the tab 49 to clear the center opening 43 of the guide bar platform, the following example for a desired miter angle setting of 5° will be described in which the offset angle φ is 10°. The operator places the pin in either hole 41 or 45, depending on the desired direction of the angle from the center line, 0° gauge angle setting, and rotates the frame to about the approximate 5° mark on the frame protractor, as you would with a conventional miter gauge. Assuming the pin is placed in hole 41 to set a 5° miter angle in which the frame is rotated clockwise as viewed in FIG. 2, the total angle between the pins F and S is then 15°. The operator then uses the same solution as used above for angles greater than about 10° to determine the distance between pins F and S. In this case the distance FS is determined from the same relationship as follows:

$$FS=10 \cdot Sine(\theta+\psi)/2=10 \cdot Sine(15°/2)$$

The operator simply divides the angle in half, which is 7° 30', looks-up the sine of this angle, which is 0.13053, and moves the decimal point 1 place to the right to obtain the FS distance setting of 1.3053. Once the distance FS is determined, the calipers are used to set the pins F and S the required distance apart in the same manner as described above and the desired miter angle of 5° is set.

Thus it will be seen that a very simple and mechanically uncomplicated miter gauge and method have been provided which allows very precise miter angles to be set which does not require addition complicated hardware and associated mechanical parts to the gauge.

Although a preferred embodiment and method of the invention has been described using specific terms, such description is for illustrative purposes only, and it is to be understood that changes and variations may be made without departing from the spirit and scope of the following claims.

What is claimed is:

1. A miter gauge for setting a selected miter angle between a workpiece and a tool, said tool having a guide groove in a surface thereof over which the workpiece is to be moved in a direction parallel to said guide groove, comprising:

a guide bar adapted to be slidably disposed in said guide groove to move in directions parallel to said guide groove;

a frame member pivotally mounted on said guide bar at a pivot point about which said frame is pivoted to set said miter angle and adapted to receive said workpiece in a position to move said workpiece over said surface of said tool at said selected miter angle;

said frame member having a satellite gauge pin disposed thereon at a fixed position (S) on said frame at a radial distance of 5 inches from said pivot point so that as said frame is pivoted on said guide bar to set said miter angle said satellite gauge pin is rotated about said pivot point at a fixed radius of 5 inches;

said guide bar having a center reference pin hole therein located at a fixed radial position (F) which is 5 inches from said pivot point at which said frame is mounted on said guide bar; and a removable reference pin disposed in said center reference pin hole so that a distance FS between the axes of said satellite pin and said center reference pin is gauged to set the desired miter angle in accordance with the relationship $$FS=10 \cdot Sine(\theta/2)$$

where θ is the desired miter angle.

2. The miter gauge as set forth in claim 1 wherein said frame member includes a clamping means for clamping said frame to said guide bar at the desired miter angle setting.

3. The miter gauge as set forth in claim 1 wherein said guide bar is an elongated bar having a generally rectangular cross section along a longitudinal axis thereof parallel to said guide groove and includes a top surface on which said frame is mounted and further including a platform disposed at one end thereof extending upward from said guide bar and having an upper surface parallel to the top surface thereof in which said center reference pin hole is located along the longitudinal axis of said bar and wherein said frame member includes a rearward extending tab in which said satellite pin is mounted.

4. The miter gauge as set forth in claim 3 wherein said rearwardly extending tab of said frame is disposed to fit above said platform of said guide bar so that said tab portion of said frame may be positioned over said platform of said guide bar when said frame member is pivoted into a central reference position at a miter angle of 0° wherein the axis of said satellite pin is aligned with the axis of said center reference pin hole in said guide bar.

5. The miter gauge as set forth in claim 4 wherein said frame member includes a semicircular slot and clamping means extending through said slot for clamping said frame member to said guide bar at a set miter angle.

6. The miter gauge as set forth in claim 5 wherein said frame member includes angle index markings along one edge of said semicircular slot graduated in a dual scale from 0° in both directions of rotation of said frame member about said pivot point from said central reference position to aid in positioning said frame at the desired miter angle.

7. The miter gauge as set forth in claim 6 wherein said platform of said guide bar further includes first and second additional reference pin holes disposed on a common radius with said center reference pin hole about said frame pivot point and on opposite sides thereof at the same fixed offset angle of rotation (φ) from said central reference position to provide reference pin positions for setting miter angles near 0° in which said center reference pin hole is covered by said tab of said frame member.

8. A method of setting a desired miter angle of a miter gauge including a guide bar adapted to slidably fit in a guide groove of a tool surface over which a work piece held by said miter gauge is moved, a frame member pivotally mounted on said guide bar and having a satellite gauge pin disposed thereon at a fixed position (S) on said frame at a radial distance of 5 inches from said pivot point so that as said frame is pivoted on said guide bar to set said miter angle said satellite gauge pin is rotated about said pivot point at a fixed radius of 5 inches, said guide bar having a center reference pin hole therein located at a fixed radial position (F) which is 5 inches from said pivot point at which said frame is mounted on said guide bar, and a removable reference pin disposed in said center reference pin hole, the method comprising the steps of:

calculating a distance value FS between said satellite pin position and said reference pin position in accordance with the relationship $$FS = 10 \cdot \text{Sine}(\theta/2)$$

where θ is the desired miter angle; and pivoting said frame while gauging the distance between said pins to coincide with the calculated distance FS to set the desired miter angle θ.

9. The method of setting a desired miter angle of a miter gauge as set forth in claim 8 wherein said miter gauge further includes a clamping means for clamping said frame member to said guide bar and further including the step of clamping said frame member to said guide bar at the desired miter angle.

10. The method of setting a desired miter angle of a miter gauge as set forth in claim 9 wherein said guide bar of said miter gauge further includes first and second additional reference pin holes disposed on a common radius with said center reference pin hole about said frame pivot point and on opposite sides thereof at the same fixed angle ($\phi$) of rotation from said central reference position to provide reference pin positions for setting miter angles near 0° in which said center reference pin hole is in near alignment with said center reference pin hole and further including the step of positioning said reference pin in one of said additional reference pin holes depending on the direction of the desired miter angle to be set from said central reference position, and wherein said calculating step further includes calculating a distance value FS between said satellite pin position and said reference pin position in accordance with the relationship $$FS = 10 \cdot \text{Sine}(\theta + \psi)/2.$$

* * * * *